July 22, 1924.
S. G. NEAL
1,502,519
AIR BRAKE APPARATUS
Filed May 2, 1923
11 Sheets-Sheet 3
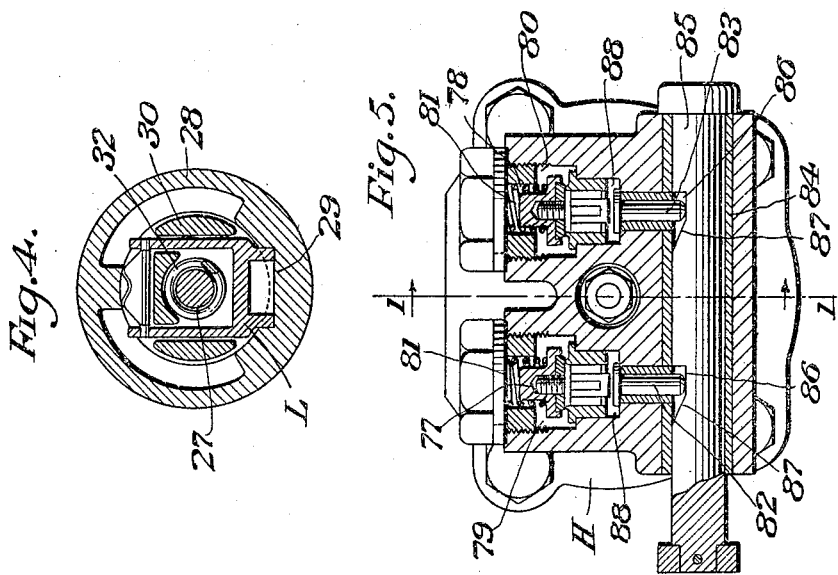
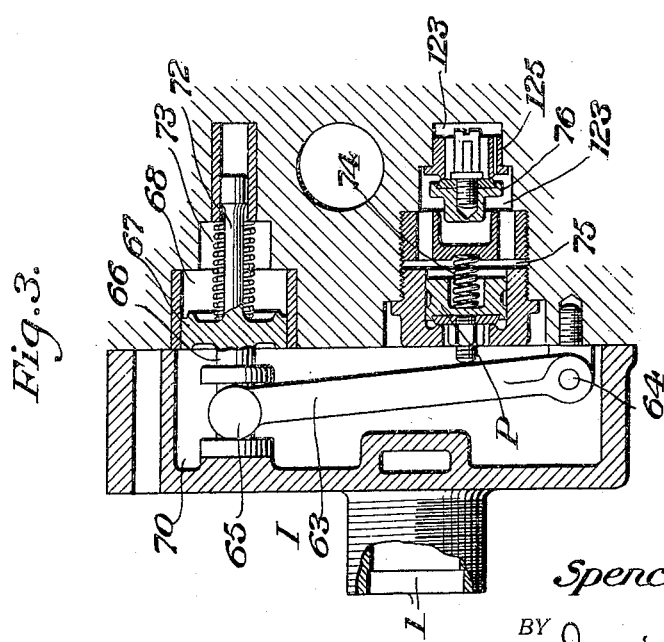
INVENTOR
Spencer G. Neal
BY
ATTORNEYS

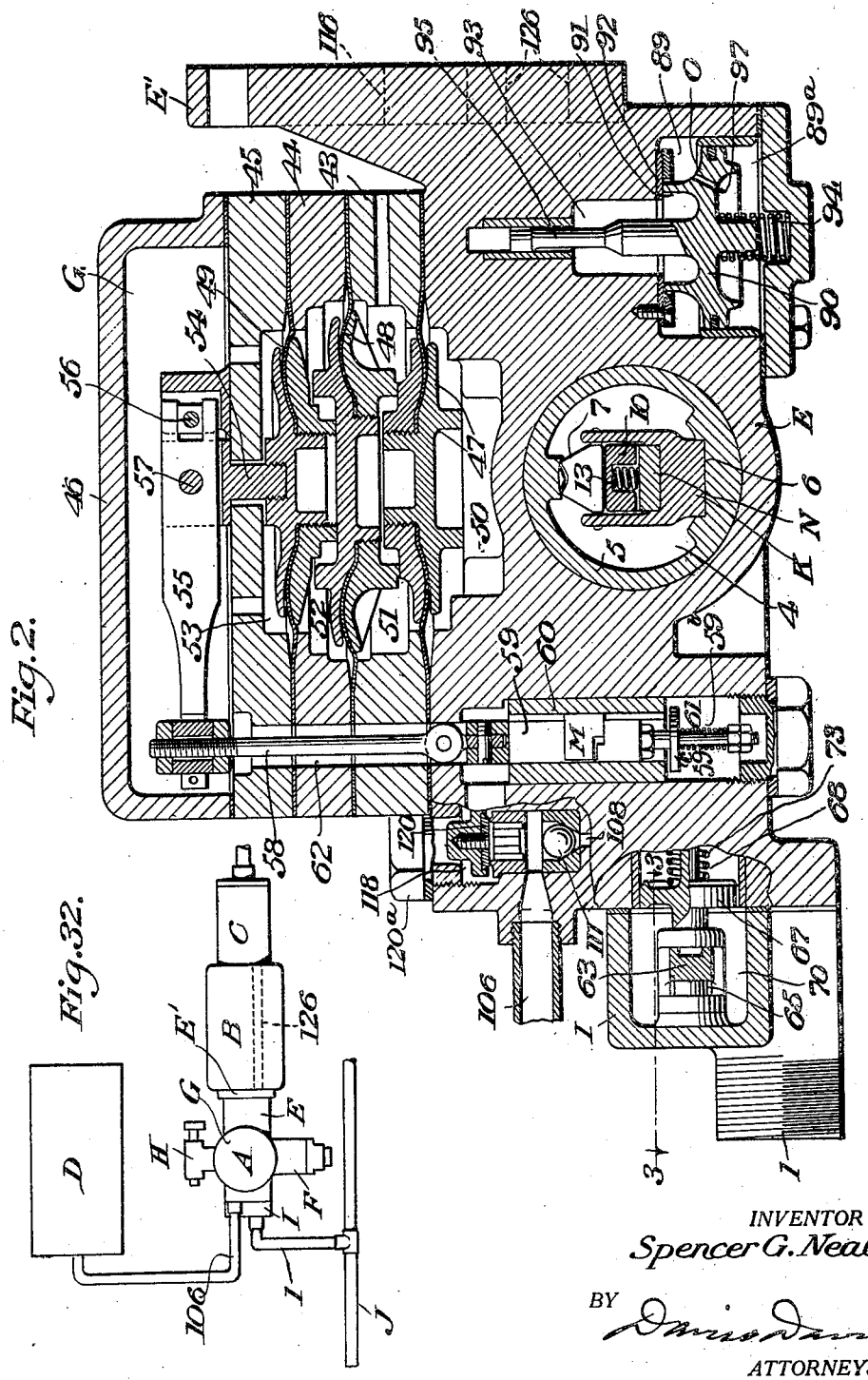

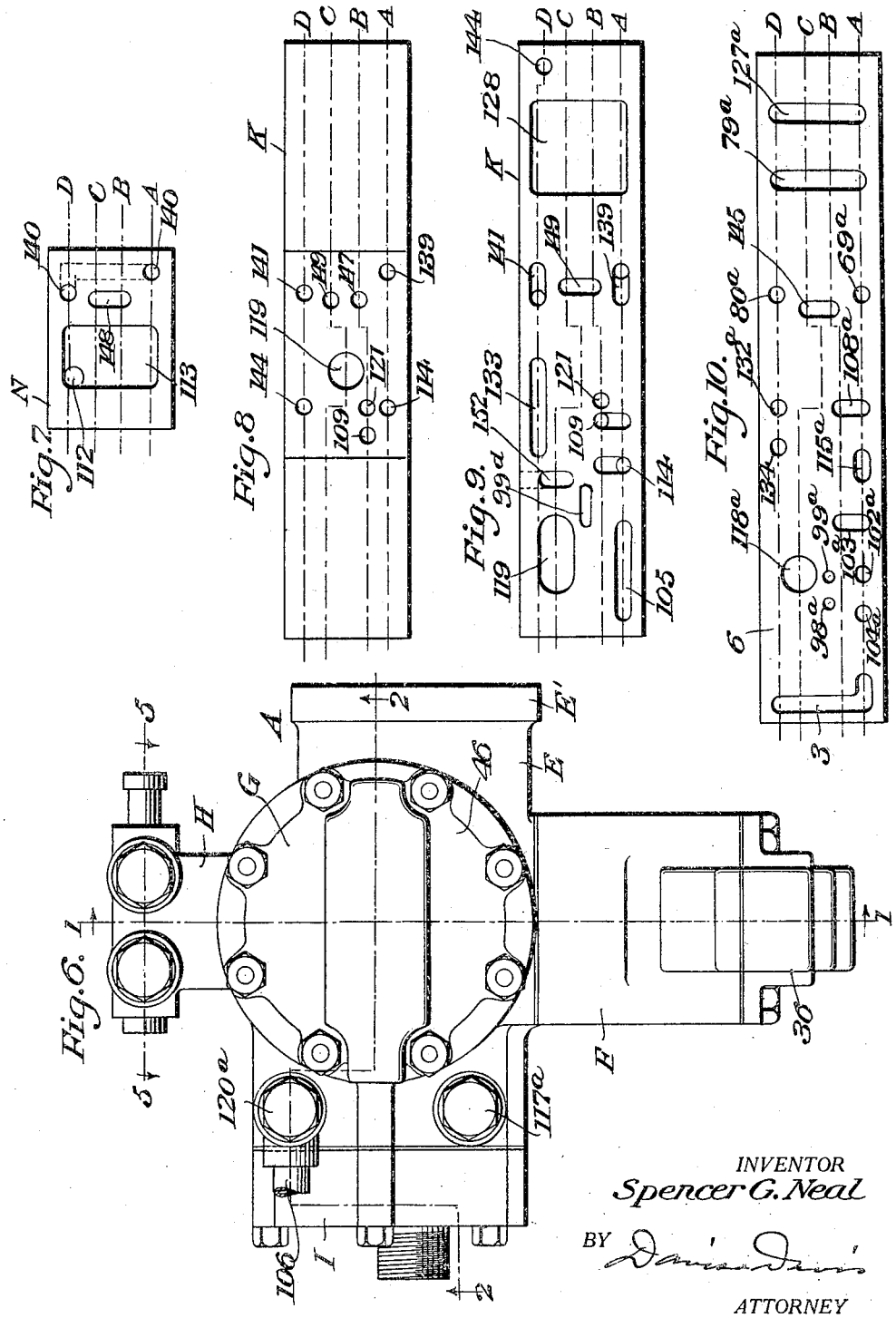

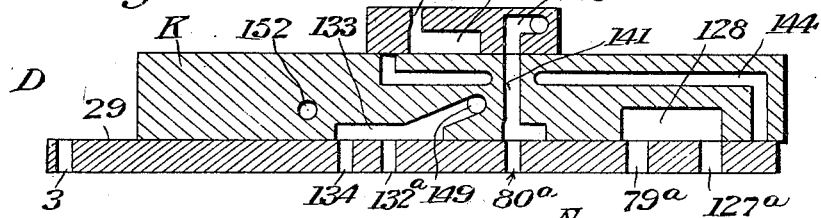
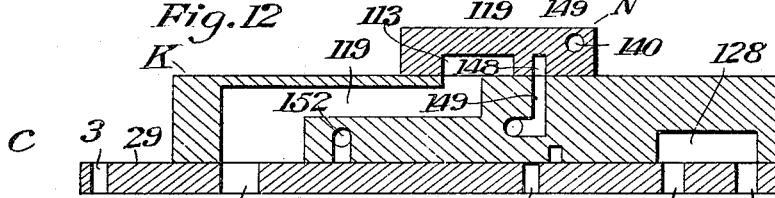
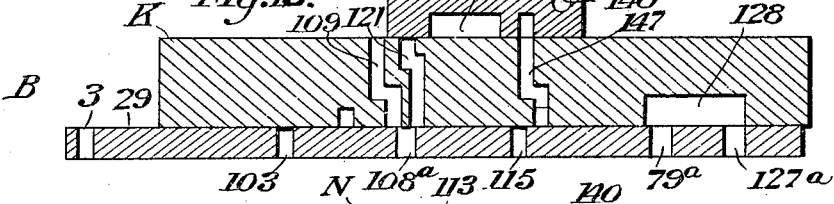
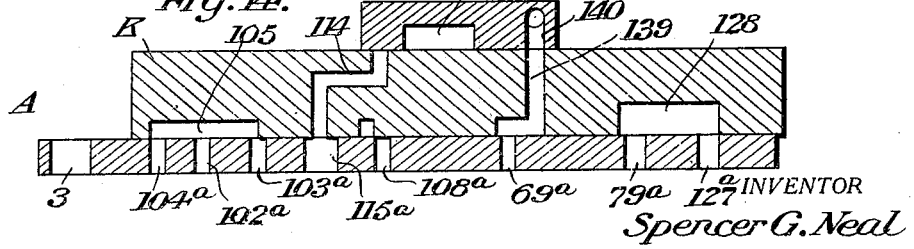

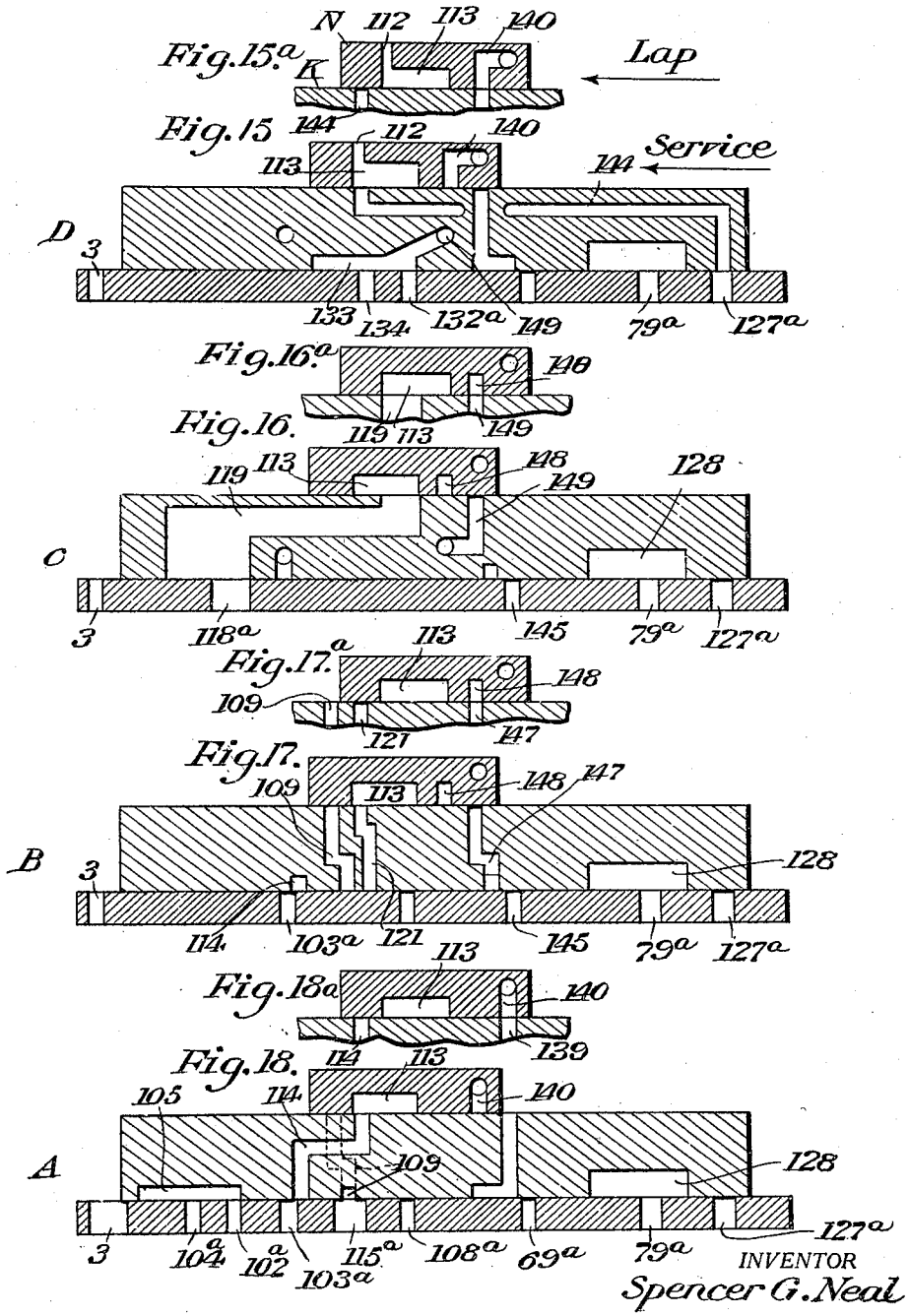

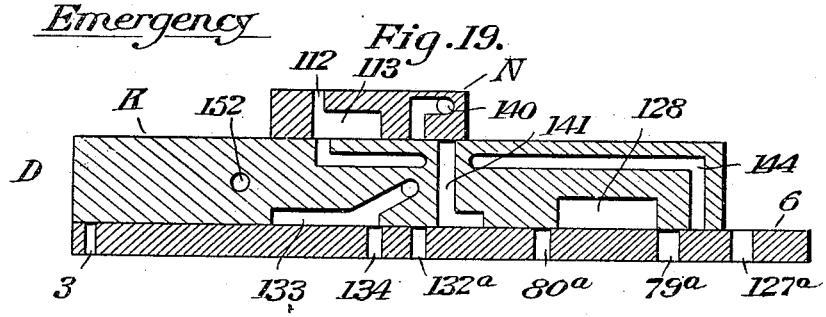
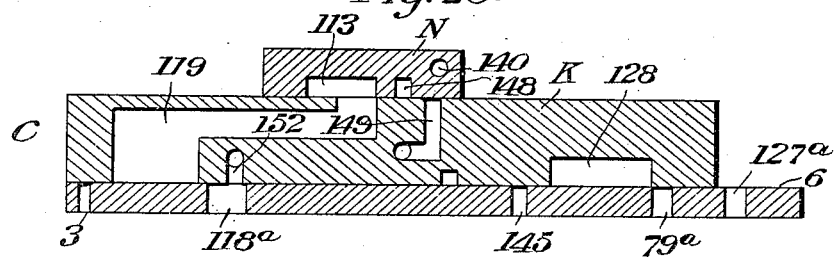
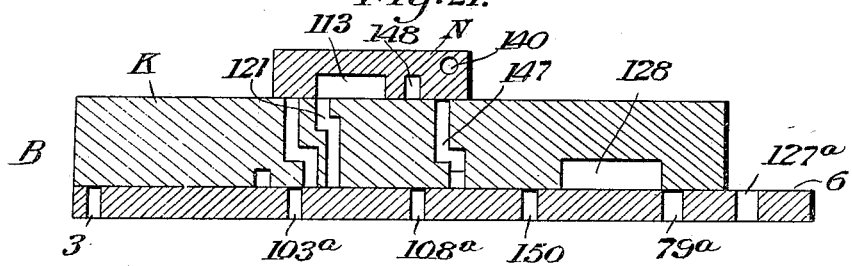
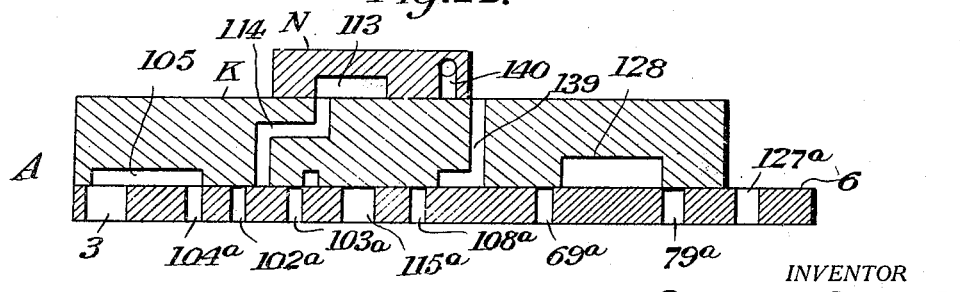

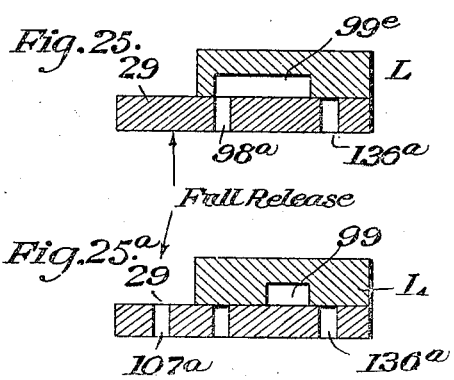
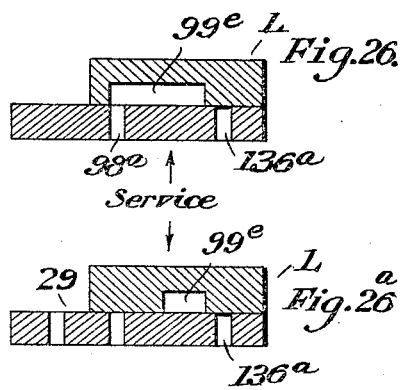
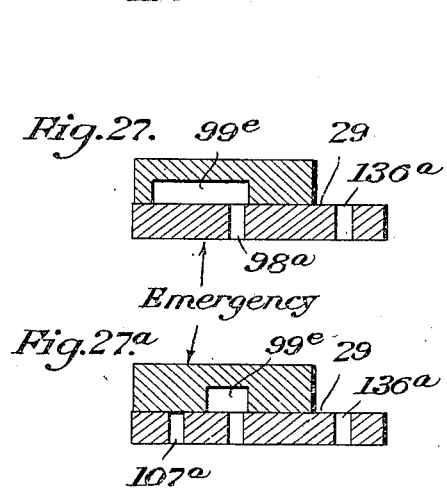
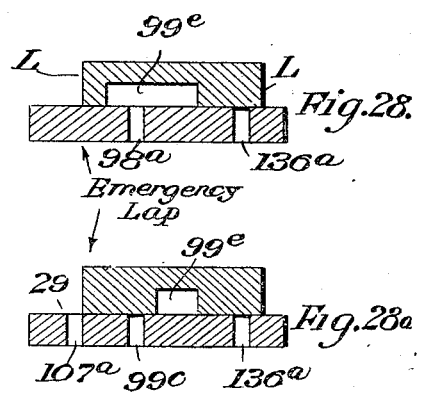
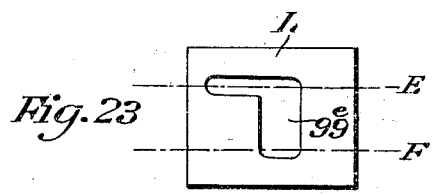
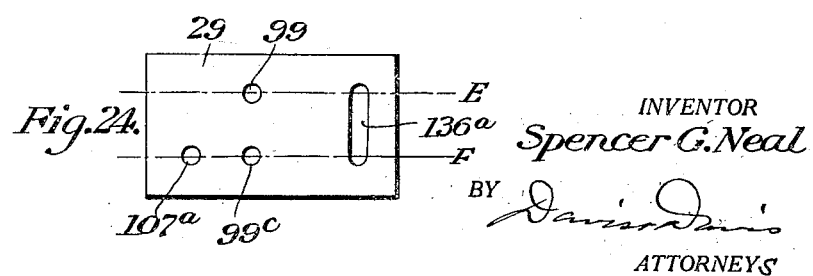

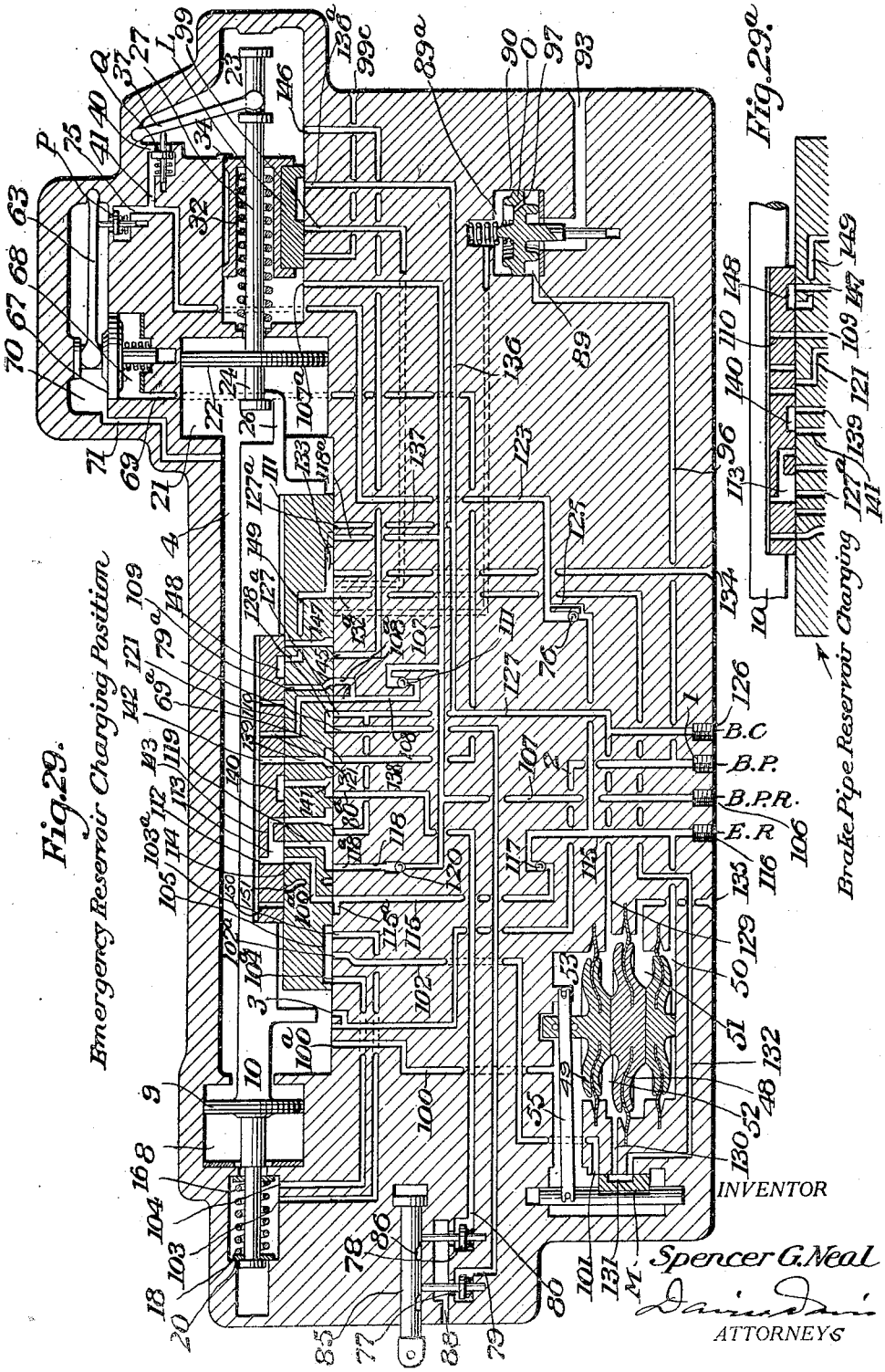

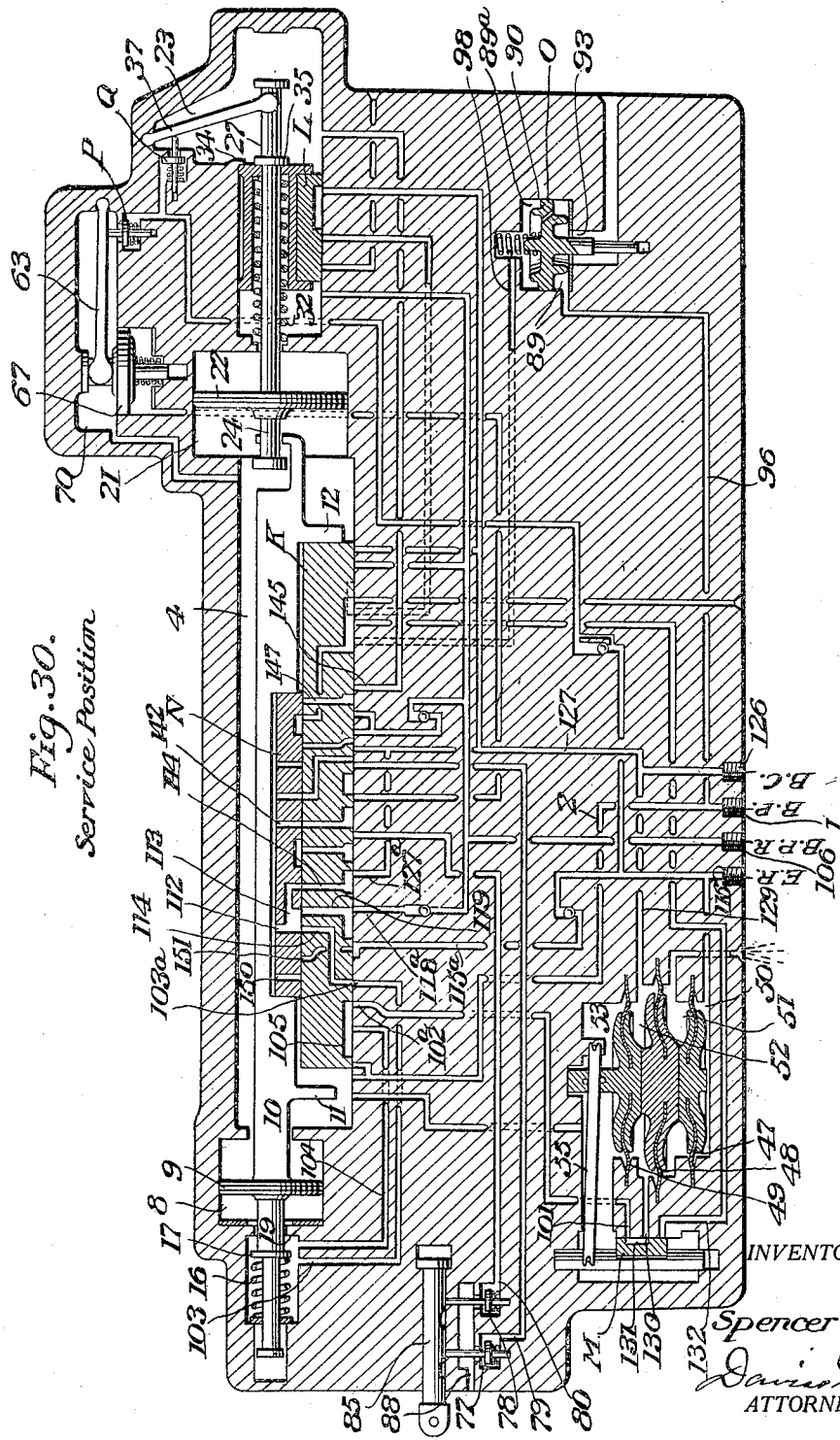

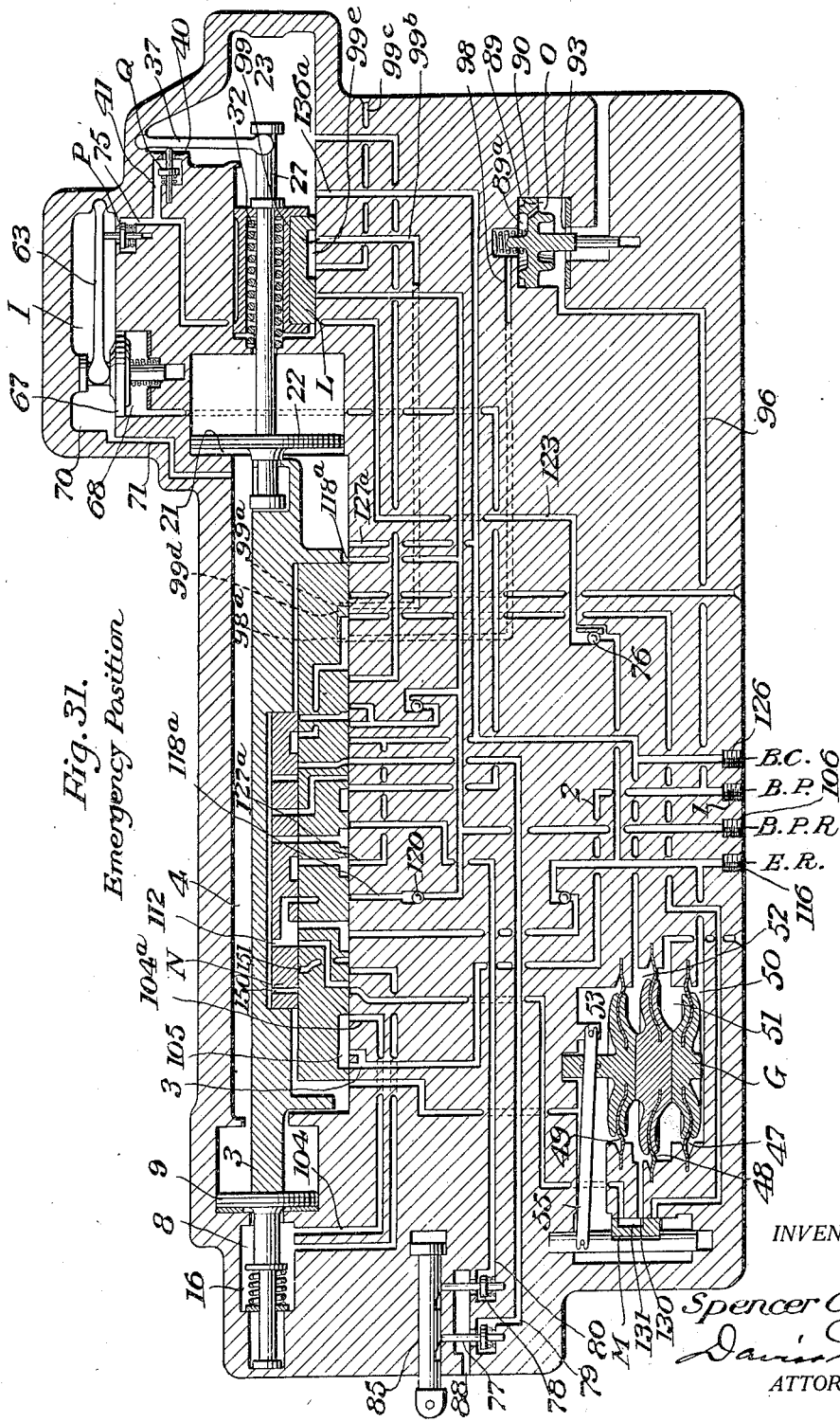
Fig. 31. Emergency Position

Patented July 22, 1924.

1,502,519

UNITED STATES PATENT OFFICE.

SPENCER G. NEAL, OF NEW YORK, N. Y., ASSIGNOR TO AUTOMATIC STRAIGHT AIR BRAKE COMPANY, OF WILMINGTON, DELAWARE, A CORPORATION OF DELAWARE.

AIR-BRAKE APPARATUS.

Application filed May 2, 1923. Serial No. 636,095.

*To all whom it may concern:*

Be it known that I, SPENCER G. NEAL, a citizen of the United States, and resident of the borough of Manhattan, in the city, county, and State of New York, have invented certain new and useful Improvements in Air-Brake Apparatus (Case No. 46), of which the following is a specification.

This invention relates to improvements in that type of air brake apparatus disclosed in patents numbered 1,411,368, dated April 4, 1922, and 1,418,961, dated June 6, 1922. These patents disclose an air brake apparatus in which brake pipe and brake pipe reservoir air is used for all service applications of the brakes, an emergency reservoir supplying air for emergency application of the brakes. In the apparatus disclosed in said patents the brake pipe volume is augmented by the brake pipe reservoir, air from said reservoir passing to the brake cylinder with air from the brake pipe during all service applications of the brakes, so that the brake pipe reservoir contains brake pipe air at brake pipe pressure. It is a further characteristic of the apparatus disclosed in said patents that the brake cylinder pressure controls the movement of the triple valve to lap position so that the brake cylinder pressure will be built up to the desired degree without regard to the length of piston travel or brake cylinder leaks.

The main object of this invention is to simplify and improve the construction of the apparatus disclosed in the aforesaid patents.

A further object of the invention is to simplify and improve the means for obtaining a quick release of the brakes.

Another object of the invention is to simplify and improve the means for obtaining an emergency application of the brakes.

In the drawings:

Fig. 1 is a vertical central sectional view of the triple valve on the lines 1—1 of Figs. 5 and 6;

Fig. 2 a vertical sectional view of the triple valve on the line 2—2 of Fig. 6;

Fig. 3 a detail horizontal sectional view on the line 3—3 of Fig. 2;

Fig. 4 a detail transverse sectional view of the emergency valve taken on the line 4—4 of Fig. 1;

Fig. 5 a detail sectional view of the release governing valve taken on the lines 5—5 of Figs. 1 and 6;

Fig. 6 is a plan view of the triple valve;

Fig. 7 a diagram of the graduating valve showing the ports as arranged on the face of the valve;

Fig. 8 a plan view of the main slide valve showing the ports in the upper side thereof which coact with the ports in the graduating valve;

Fig. 9 a diagram of the main slide valve showing the ports in the face of the valve;

Fig. 10 a view of the main slide valve seat showing the ports therein;

Figs. 11, 12, 13 and 14 are sectional views of the main slide and graduating valves in brake pipe reservoir charging position, said sections being taken on the lines D—C—B and A of Figs. 7 to 10 inclusive;

Figs. 11$^a$, 12$^a$, 13$^a$ and 14$^a$ are sectional views of the graduating valve and a portion of the main slide valve in emergency reservoir charging position, taken on the lines D—C—B and A of Figs. 7 to 10 inclusive;

Figs. 15, 16, 17 and 18 are sectional views of the main slide and graduating valves in service application position, said sections being taken on the lines D—C—B and A of Figs. 7 to 10 inclusive;

Figs. 15$^a$, 16$^a$, 17$^a$ and 18$^a$ are sectional views of the graduating valve and a portion of the main slide valve, showing the graduating valve in service lap position, said sections being taken on the lines D—C—B and A of Figs. 7 to 10 inclusive;

Figs. 19, 20, 21 and 22 are sectional views of the main slide and graduating valves in emergency application position, said sections being taken on the lines D—C—B and A of Figs. 7 to 10 inclusive;

Fig. 23 a diagram of the emergency valve showing the cavity in the face of the valve;

Fig. 24 a plan view of the emergency valve seat showing the ports therein;

Figs. 25 and 25$^a$ are sectional views of the emergency valve and its seat with the emergency valve in full-release position, the sections being taken on the lines E and F of Figs. 23 and 24;

Figs. 26 and 26$^a$ are sectional views taken on the lines E and F of Figs. 23 and 24 with the emergency valve in service position, the position of this valve being the same in service and full-release positions;

Figs. 27 and 27ª are sectional views taken on the lines E and F of Figs. 23 and 24, showing the emergency valve in emergency position;

Figs. 28 and 28ª are sectional views similar to Figs. 27 and 27ª, showing the emergency valve in emergency lap position;

Fig. 29 is a diagrammatic view of the entire triple valve, showing the ports and passages and valves diagrammatically arranged with the parts in full-release and emergency reservoir charging position, the release-governing valve being in quick-release position;

Fig. 29ª a detail diagrammatic view of the graduating valve and a portion of the main slide valve, with the graduating valve in brake pipe reservoir charging position;

Fig. 30 is a diagrammatic view similar to Fig. 29, with the parts in service application position;

Fig. 31 is a diagrammatic view similar to Figs. 29 and 30, showing the valves in emergency application position;

Figure 1:
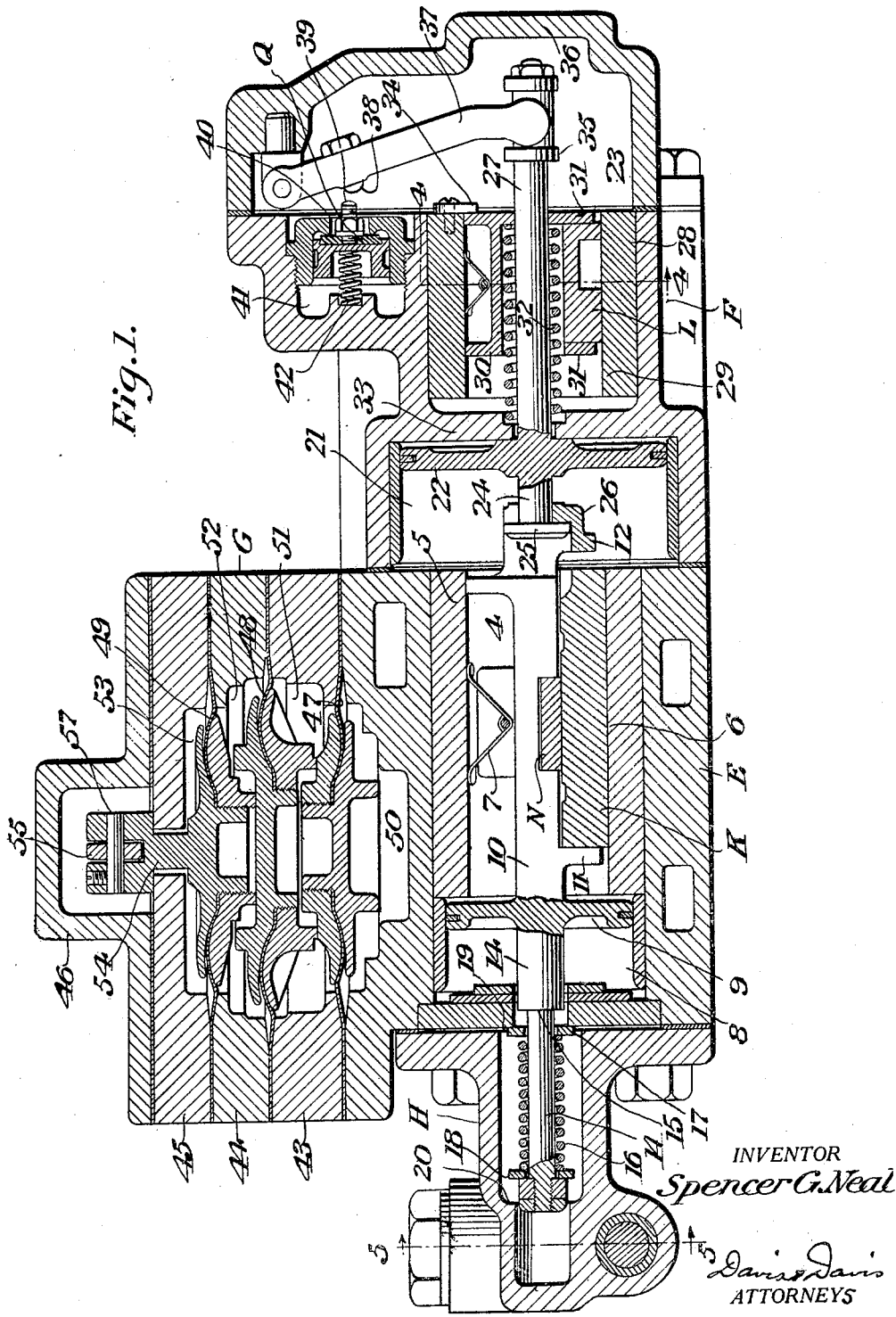

Fig. 32 a plan view of the triple valve, showing the brake pipe reservoir, emergency reservoir and brake cylinder connected thereto.

Referring to the various parts by reference characters, A designates the triple valve body; B the emergency reservoir; C the brake cylinder, and D the brake pipe reservoir (see Fig. 32).

The triple valve comprises a main body portion E which contains the main and graduating valves and the service piston; the emergency section F which contains the emergency valve and the release and emergency piston; the controller section G which contains the means for operating the pilot valve and controlling brake cylinder pressure; the release-governing valve section H which contains the manually adjustable means for causing the triple valve to operate in graduated release or in quick release; the quick-release section I which contains the quick-release valve and means for operating it.

J designates the brake pipe; K the main or service slide valve; L the emergency slide valve; M the pilot valve which controls the triple valve for service applications of the brakes and for the graduated release of the brakes; N the graduating valve; and O the brake pipe vent valve. P designates the quick-release valve which controls the discharge of emergency reservoir air into the main slide valve chamber and thence to the brake pipe for a quick serial release of the brakes. Q designates the emergency reservoir valve which controls the discharge of emergency reservoir air to the brake cylinder for an emergency application of the brakes.

In order to simplify the description, the structural arrangement of the various parts will be first described, and then the various ports, passages and valves and their functions and movements will be described in detail in connection with the several valve operations. In the drawings illustrating the general construction and arrangement of the triple valve, the ports and passages have been omitted in order to simplify the drawings and prevent confusion. The ports and passages are illustrated diagrammatically in Figs. 29, 30 and 31 and have been illustrated correctly in Figs. 7 to 28ª inclusive. In view of the full illustrations of the ports and passages in the detail views it is thought unnecessary to attempt to illustrate them in the views showing the construction and arrangement of the parts of the triple valve.

The main body part E (see Figs. 1–10) of the triple valve is provided with a brake pipe connection 1 which is in direct communication through a passage 2 with a port 3 in the main slide valve seat, thereby placing the brake pipe in direct comunication with the main brake pipe chamber 4, said chamber also constituting the main slide valve chamber. In the chamber 4 is arranged a bushing 5 in which is formed the main slide valve seat 6, the main slide valve K operating on said seat and being held in position thereon by means of a spring 7 carried by the main slide valve and bearing on the inner surface of the bushing directly over the valve. In the main body portion E of the triple valve is formed a supplemental brake pipe chamber 8 at one end of the main brake pipe chamber 4. The chamber 8 is cylindrical and is provided with a bushing in which reciprocates a service piston 9, said piston serving as a movable abutment separating the main brake pipe chamber 4 from the supplemental brake pipe chamber 8. Connected rigidly to the service piston 9 and extending centrally through the main brake pipe chamber 4 is a valve stem 10 which carries two abutmentes 11 and 12 which are adapted to engage the ends of the main slide valve. The distance between said abutments is greater than the length of the main slide valve so that the valve stem may have a certain limited movement independently of the main valve. The valve stem 10 is cut out to receive the graduating valve N, said valve being fitted between the shoulders on the stem so that it will move with the stem. As illustrated the graduating valve operates on the upper surface of the main slide valve and is held yieldingly in engagement therewith by means of a light coil spring 13 seated in the valve stem and forcing the graduating valve into engagement with the main slide valve. The service piston 9 is provided with a rigid stem 14 which extends outwardly through the supplemental brake pipe chamber 8, its outer end being reduced in diameter to form the shoulder or abutment 15. The reduced outer end of this stem extends into a chamber formed within the casing H of the release-governing valve, and surrounding this reduced portion within said casing is a coil spring 16. This spring serves to lap the graduating valve thereby stopping further flow of air to the brake cylinder. The spring 16 is confined between two collars 17 and 18 loosely arranged on the reduced portion of the stem 14. The collar 17 normally rests against an abutment 19 and is adapted to be engaged and moved away from said abutment by the shoulder 15 of the stem 14 when the main slide valve is moved into service position. The washer 18 is adapted to engage an abutment 20 formed in the casing H. The triple valve is attached to the emergency reservoir by means of the flange E'; and the brake cylinder passage and the emergency reservoir passage run through this flange.

The emergency section F is secured to the side of the main body portion E and is provided with a piston chamber 21 which at one side is in open communication with the main brake pipe chamber 4. In this piston chamber is arranged a release and emergency piston 22 which is considerably larger in diameter than the service piston 9, said two pistons being axially in line with each other. In the emergency section F is also formed an emergency valve chamber 23 which is in communication with the piston chamber 21, the piston 22 forming a movable abutment separating the emergency valve chamber 23 from the main brake pipe chamber 4 so that the air pressure in the main brake pipe chamber 4 will operate on one side of the release and emergency piston and the air pressure in the emergency valve chamber 23 will operate on the other side of said piston. That side of the piston 22 which is exposed to the air pressure in the main brake pipe chamber 4 might be termed the release side of the piston, and that side which is exposed to the air pressure in the emergency valve chamber might be termed the emergency side of said piston. The piston 22 is formed with a releasing stem 24 which extends into the main brake pipe chamber 4 and is formed with a head 25. The main slide valve stem 10 is formed with an open yoke 26 at its end adjacent the shoulder 12, said yoke loosely engaging the release stem 24 and being loosely interlocked with the head 25. The purpose of this loose connection is to permit the piston 22 to move the main slide valve to release position and at the same time permit the piston 22 and the main slide valve stem to have movements independently of each other during service and emergency operation, but more particularly to permit the piston 22 and the emergency valve to have an independent movement to emergency lap position. The release and emergency piston is larger than the service piston so that an increase in brake pipe pressure in the main brake pipe chamber 4 will move the piston 22 toward the right hand, as viewed in Figs. 1 and 30, and carry the main slide valve to release and charging position, as will be more fully hereinafter described.

The release and emergency piston 22 is formed with a central operating stem 27 which extends outwardly through the emergency valve chamber 23. In the emergency valve chamber is arranged a bushing 28 in which is formed an emergency valve seat 29 on which the emergency valve L operates. The emergency valve is held in position on its seat by a tubular guide 30, said guide surrounding the stem 27 and carrying depending abutments 31 between which the emergency valve is held. Surrounding the operating stem 27 is a coil emergency spring 32, said spring being confined between the closed outer end of the guide 30 and the wall 33 which divides the emergency valve chamber from the piston chamber 21. This wall 33 is provided with a large aperture for the passage of the operating stem 27 and also so that the emergency valve chamber will be always in open communication with chamber 21 at the emergency side of the piston 22. In the emergency valve chamber is arranged a stop 34 adapted to be engaged by the guide 30 to stop the emergency valve in its normal position, said valve remaining in said normal position at all times except when it is moved into emergency position, as will be hereinafter described. The spring 32 normally holds the emergency valve against the stop 34 and returns it to its normal position against said stop when the brakes are released after an emergency application. The operating stem 27 is provided at its end with a rigid collar 35 which is adapted to engage the outer end of the guide 30 when the piston 22 moves inwardly to service position or to its emergency position. When the main slide valve is moved to service application position, as will be fully hereinafter described, the collar 35 will serve as a stop to limit the inward movement of the piston 22 as shown in Fig. 30. When the main slide valve is moved inwardly to emergency position the collar 35 will engage the guide 30 and move it and the emergency slide valve inwardly to emergency position, compressing emergency spring 32 as illustrated in Fig. 31 and as will be more fully hereinafter described.

A cap 36 closes the outer side of the emergency section F and forms an extension of the emergency valve chamber. In this cap 36 is arranged an emergency lever 37, the lower end of which is operatively connected to the outer end of the operating stem beyond the collar 35, and the upper end of which is suitably pivoted in the cap 36. The lever 37, near its upper end, carries a valve-operating pin 38 which is adapted to engage a projecting stem 39 secured to the emergency valve Q. Valve Q controls a port 40 which is in communication with a passage 41, said valve being held yieldingly to its seat by a spring 42. When the piston 22 is moved inwardly to emergency position the lever 37 will force the emergency valve Q from its seat and thereby place passage 41 in communication with the emergency valve chamber 23. Passage 41 is in direct communication with the emergency reservoir, as will be hereinafter described. In the emergency position of the emergency slide valve L the chamber 23 is in direct communication with the brake cylinder.

The controller section G of the triple valve is mounted on the upper side of the main valve body section E and consists of rings 43 and 44, plate 45 and a cap plate 46, all of said parts being bolted together and to the upper surface of the body part E. Between these rings and the main body part of the valve are arranged diaphragms 47, 48 and 49, said diaphragms forming chambers 50, 51, 52 and 53. The diaphragm structure, including the central members which support the diaphragm, is constructed substantially as shown and described in the aforesaid patents numbered 1,411,368 and 1,418,961, and it is thought unnecessary to particularly describe that construction herein. Chamber 50 constitutes an emergency reservoir chamber and is in communication with the emergency reservoir. Chamber 51 is in direct communication with the atmosphere. Chamber 52 is the brake cylinder controlling chamber and is in direct communication with the brake cylinder. Chamber 53 is the actuating chamber and is in communication with the main brake pipe chamber 4 and, through said chamber, with the brake pipe, said communication being open to the brake pipe at all times except when the main slide valve has been moved to emergency position. The cap 46 forms an extension of the actuating chamber and is in open and direct communication with said chamber 53 through openings in the plate 45. The central supporting member of the actuating diaphragm 49 is provided with a shouldered stem 54 which extends through the central opening in the plate 45. The shoulder on said stem is adapted to contact with the upper surface of plate 45 and the upper supporting member of diaphragm 49 is adapted to contact with the lower surface of plate 45, and thereby serve as means for limiting the travel of the actuating diaphragm 49. As all of the diaphragms move together, or substantially so, the said above mentioned means will serve as a means for limiting the extent of travel of all the diaphragms. Pivotally mounted in the extension of the actuating chamber formed by the cap 46 is a pilot valve lever 55, said lever being mounted at one end on a pivot 56 and being connected by pin 57 to the upper end of the shouldered stem 54. The outer free end of the pilot valve lever is connected by a rod 58 to a guide 59 which carries the pilot valve M. The guide 59 operates in a bushing 60 mounted in a chamber 61, and said chamber is in open communication with the actuating chamber through the aperture 62, the operating rod 58 extending through said aperture 62 as clearly shown in Fig. 2 of the drawings. It is manifest that when the diaphragm structure moves vertically the pilot valve will be moved on its seat. The controlling diaphragm 48 which is subject to brake cylinder pressure in the brake cylinder control chamber 52 is larger in diameter than the actuating diaphragm 49 and the emergency diaphragm 47, the actuating diaphragm and the emergency diaphragm being of equal diameters. The areas of diaphragms 49 and 48 are so proportioned that it is necessary for the brake cylinder pressure to be built up in the controlling chamber 52 to approximately two and one-half times the brake pipe reduction in chamber 53 before the combined pressures of chambers 53 and 52 will overcome the undisturbed emergency reservoir pressure in chamber 50. When this takes place the pilot valve will be moved to lap position and the building up of brake cylinder pressure will be stopped, as will be fully hereinafter described. The guide 59 is provided with a shouldered stem 59ª and around the reduced part of said stem is arranged a lap spring 59ᵇ. A loose collar 59ᶜ is held against the shoulder of the stem by said spring and this collar is adapted to engage the end of the bushing 60 when the pilot valve is moved to service position. The movement of the pilot valve to service position will result in a slight compression of the lap spring so that when the pressures in the chambers 53 and 52 plus the tension of the spring 59ᵇ are sufficient to overcome the emergency reservoir pressure in chamber 50, the pilot valve will be moved downward to lap position. When lap position is reached the force of the spring 59ᵇ is removed entirely from the pilot valve and said valve will remain in lap position because the pressures in chambers 53 and 52 without the assistance of spring 59ᵇ will not be sufficient to continue the downward movement of the valve. In moving upward to release lap position spring 59ᵇ will serve as a means to stop the valve in lap position because the force of said spring will be added to the pressures in chambers 52 and 53 and will arrest the valve in release lap position. The pilot valve M may be held to its seat in any suitable manner.

In the casing I is mounted a quick-release lever 63 which is pivoted at 64 and is connected by a yoke 65 with the stem 66 of a quick-release piston 67. The piston 67 is mounted in a chamber 68 and said chamber is connected by passage 69 to a port 69ᵃ in the main slide valve seat. The chamber 70 formed by the casing I is in open communication with the main brake pipe chamber 4 through passage 71. The quick-release piston 67 is provided with a guide stem 72 which is surrounded by a coil spring 73, said spring normally holding the quick-release piston pressed outwardly with its stem 66 stopped against the outer wall of the casing I. This piston moves inwardly in quick-release operations when the chamber 68 is exhausted to atmosphere through the main slide valve and the release-governing valves, as will be hereinafter described. Chamber 68 is formed in the main body portion E of the triple valve. Mounted in the main body portion E of the triple valve is the quick-release valve P whose stem projects into the chamber 70 in the path of the quick-release lever 63. The quick-release valve is held to its seat by a spring 74 and controls communication between chamber 70 and passage 75. Passage 75 is connected to the emergency reservoir so that when the quick-release valve P is opened emergency reservoir pressure will flow into chamber 70 and thence directly into the main brake pipe chamber 4. In the passage 75 is arranged a check valve 76 which is adapted to be seated by any pressure passing around the quick-release valve from chamber 70. The valve 76 is adapted to be freely moved from its seat by emergency reservoir pressure flowing through passage 75.

In the release-governing valve casing H are arranged two check valves 77 and 78, said valves controlling passages 79 and 80. These valves are held to their seats by springs 81. Each valve is provided with a loose valve-opening plunger 82 and 83. The heads of these plungers are normally out of contact with the valves so that the valves may be firmly seated by their springs. The ends of these plungers extend into the passage 84 in which is arranged a slidable bar 85, said bar being provided with heads on its ends to limit its sliding movement in both directions. The bar 85 is recessed at 86 to receive the ends of the plungers, and one wall of each recess is inclined to form the cams 87. As shown in Fig. 5 the plungers 82 and 83 are resting within the recesses 86 and the release-governing valves 77 and 78 are seated, thereby closing the passages 79 and 80. This is the graduated-release position of the release-governing valve mechanism. By forcing the slide bar 85 inwardly the cams 87 force the plungers 82 and 83 into engagement with the release-governing valves and lift them from their seats. This opens the release-governing valves and places the passages 79 and 80 in open communication with a large exhaust port 88 formed in the release-governing valve casing H. The passage 79 is connected to the brake cylinder in the release position of the main slide valve and the passage 80 is connected to the chamber 68 in the full-release position of the main slide valve and graduating valve.

The brake pipe connection 1 is formed as a part of the casing I and the passage from said connection registers with the brake pipe passage 2 in the main body part E.

In the main valve body part E is formed a chamber 89 in which the brake pipe vent valve O is mounted. This valve is in the form of a piston 90 having an annular valve flange 91 which seats on a gasket 92, thereby sealing a large exhaust port 93. A spring 94 tends to hold the valve seated. The piston 90 is formed with a guide stem 95. The chamber 89 outside of the valve flange 91 is connected by a passage 96 directly to the brake pipe so that brake pipe pressure is always in chamber 89. This chamber 89 is connected to the space 89ᵃ on the opposite side of the piston 90 by means of a small equalizing port 97 which extends through the piston, so that brake pipe pressure will be registered on both sides of said valve piston. The space 89ᵃ opposite the brake pipe side of piston 90, is connected by passage 98 with a port 98ᵃ in the main slide valve seat. The emergency valve seat is provided with a port 99 which is connected by a passage 99ᵇ with a port 99ᵃ in the main slide valve seat close to port 98ᵃ. The emergency valve is formed with a cavity 99ᵉ which in emergency position of said valve, connects port 99 with an exhaust port 99ᶜ. A cavity 99ᵈ in the main slide valve connects ports 98ᵃ and 99ᵃ when said slide is in emergency position. When the two slide valves are in their emergency positions the chamber 89ᵃ will be vented to atmosphere and the brake pipe pressure will move the valve flange 91 from its seat and vent the brake pipe to atmosphere.

*Full release and brake pipe reservoir charging position.* (Figs. 1, 11, 12, 13, 14, 25, 25ᵃ and 29.)

In charging the system brake pipe pressure is raised in the usual manner. Air flows from the brake pipe J through the brake pipe connection 1 in the main valve body portion E, through passage 2 to the brake pipe port 3 in the main slide valve seat and into the main brake pipe chamber 4. Brake pipe air will also pass from the passage 2 through passage 96 to the chamber 89 around the valve flange of the vent valve O. From the vent chamber it will pass through passage 97 to the chamber 89ª on the opposite side of the piston 90, so that there will be an equalization of brake pipe pressure on the opposite sides of the emergency vent valve piston. From the chamber 4 air will pass through the port 100ª and passage 100 into the actuating chamber 53 of the pilot valve structure and will force the diagrams and the pilot valve downwardly to release and charging position. The rising pressure in chamber 4 will force the larger release and emergency piston 22 outwardly, that is to say toward the right-hand side as viewed in Figs. 1 and 29, to the limit of its movement, the piston 22 in this position engaging the wall 33 as a fixed stop. In this movement of the piston the head 25 of the release stem 24 will engage the yoke 26 on the valve stem 10 and move the valve stem and the main slide valve and the graduating valve to full-release and brake pipe reservoir charging position, as shown in Fig. 1. This movement of the release and emergency piston will slightly compress the graduating spring 16 and move the collar 18 away from the stop shoulder 20. In the full-release movement of the piston 22 the stem 27 slides through the emergency valve guide and said valve remains in its normal position.

When the pilot valve has been moved downwardly to release position it uncovers the port 101 which is connected by passage 102 to a port 102ª in the main slide valve seat so that brake pipe air from chamber 53 will flow through said passage. The supplemental brake pipe chamber 8 is connected by passages 103 and 104 to ports 103ª and 104ª in the main slide valve seat. In the main slide valve is formed a cavity 105 which, in the release position of the main slide valve, connects port 102ª with ports 103ª and 104ª so that brake pipe pressure may flow from chamber 53 through said ports and passages into the supplemental brake pipe chamber 8 to thereby permit the pressure on opposite slides of the service piston 9 to equalize.

The brake pipe reservoir is connected to the main body portion E at 106 and, through passages 107 and 108, to the port 108ª in the main slide valve seat. This port is in register with a port 109 in the main slide valve, this latter port being uncovered and opening into chamber 4 (see Fig. 13). In Fig. 29 a port 110 in the graduating valve is shown to indicate this connection. Brake pipe air will flow from chamber 4 through ports 109, and 108ª to the brake pipe reservoir. Passage 107 is connected to port 107ª in the emergency valve seat so that brake pipe reservoir air will flow in the emergency valve chamber. A check valve 111 is arranged in passage 108 to prevent back-flow of brake pipe reservoir air through said passage to chamber 4. Air will continue to flow to the brake pipe reservoir until the pressure therein equalizes with the brake pipe pressure. The pressures will be then equalized on opposite sides of piston 22 and the graduating spring 16 will then move the graduating valve to emergency reservoir charging position, and the collar 18 will be brought into engagement with the abutment 20, the collar 17 remaining in engagement with the abutment 19. This places the graduating valve in proper position to charge the emergency reservoir. The movement of the valve stem 10 will result in a slight idle movement of the piston 22 and its stem.

*Emergency reservoir charging position.* (Figs. 11ª, 12ª, 13ª, 14ª and 29.)

When the graduating valve is moved to emergency reservoir charging position brake pipe air will flow through port 112 in the graduating valve into the cavity 113 therein. From this cavity air will flow through port 114 in the main slide valve to port 115ª in the main slide valve seat and thence through passage 115 to the emergency reservoir connection 116 which runs through the flange E' and connects directly to the emergency reservoir. A check valve 117 is arranged in passage 115 to prevent back-flow of pressure from the emergency reservoir to the chamber 4. The brake pipe reservoir passage 107 is connected to a discharge port 118ª in the main slide valve seat by passage 118; and port 118ª is connected to the cavity 113 by a port 119 in the main slide valve so that brake pipe reservoir air may flow into said cavity and thence with brake pipe air to the emergency reservoir. The brake pipe reservoir charging port 108ª is extended in the main slide valve seat and said extension is in register with a supplemental charging port 121 in the main slide valve. In the emergency reservoir charging position of the graduating valve port 121 is in connection with chamber 4 through cavity 113 and port 112, (see Figs. 11ª and 13ª) so that brake pipe air may flow through said connected ports past the check valve 111 to maintain the final equalization of the pressures in the brake pipe chamber 4, brake pipe reservoir and the emergency reservoir. A port 121ª in the graduating valve is shown in Fig. 29 to indicate this connection. When this final equalization has taken place the system is fully charged and the triple valve is in running position. Should there be a flow of air from the brake pipe reservoir through port 118ª to cavity 113, there will immediately be a compensating flow from chamber 4 through port 121, past check valve 111, and the balanced pressures on opposite sides of piston 22 will not be disturbed.

A check valve 120 is arranged in the passage 118 to prevent the flow of air from chamber 4 through said passage 118 to the brake pipe reservoir. The check valves 111 and 120 are arranged in a chamber formed in the main valve body part E, and said chamber is closed by a plug 120ª as shown in Figs. 2 and 6. The check valve 117 is arranged in a similar chamber and said chamber is closed by a plug 117ª.

The emergency reservoir passage 115 is connected by passage 123 to the passage 41 of the emergency reservoir valve Q, and to the passage 75 of the quick-release valve P. In this passage 123 is arranged the check valve 76 which prevents back-flow of pressure through said passage to the emergency reservoir. The check valve 76 prevents the charging of the emergency reservoir through chamber 70. Around this check valve is a small by-pass port 125. The by-pass port 125 permits a slow charging of the emergency reservoir from chamber 70, but the final charging will take place through the main and graduating valves. The by-pass charging port 125 may be omitted if desired.

When the graduating valve is in emergency reservoir charging position, port 69ª registers with a port 139 in the main slide valve and this latter port is open to chamber 4 (see Fig. 14ª) and brake pipe air will flow from the chamber 4 through said ports and passages into the piston chamber 68 so that the pressures on opposite sides of the piston will be equalized. Port 142 is shown in Fig. 29 to indicate this connection.

*Service position.* (*Figs. 15 to 18 inclusive, 26, 26ª and 30.*)

To obtain a service application of the brakes a slow brake pipe reduction is made in the usual way, resulting in a corresponding reduction of pressure in the main brake pipe chamber 4 and in actuating chamber 53. The undisturbed emergency reservoir pressure in chamber 50 forces the diaphragms 47, 48 and 49 upwardly and moves the pilot valve upwardly to service position as shown in Fig. 30, placing the passage 130 in communication with passage 101 through the pilot valve cavity 131. The pilot valve also closes exhaust passage 132. Air will flow from chamber 8 through passage 104, cavity 105 and port 102ª to the control chamber 52 and thence to the brake cylinder. The pressure being thus reduced in chamber 8 will permit brake pipe pressure in chamber 4 to move the service piston 9 to service position, the main slide valve and the graduating valve taking the positions shown in Figs. 15, 16, 17, 18 and 30. This movement of the service piston will be sufficient to partly compress the graduating spring 16. Brake pipe air will flow from chamber 4 through port 112 into the cavity 113. Brake pipe reservoir air will flow through port 118ª, port 119 into the cavity 113. From this cavity the air will flow through port 144 of the main slide valve into the brake cylinder port 127ª.

When the main slide valve and the graduating valve are in service application position, port 114 of the main slide valve is in communication with cavity 113 and port 103ª (see Fig. 18) so that brake pipe air may flow from chamber 4 into chamber 8 and stop the movement of the service piston. So long as the pilot valve remains in service position air will continue to flow from chamber 8 into the control chamber 52. Brake cylinder pressure will flow into the control chamber through passage 129, and when the brake cylinder pressure has been built up to the desired degree and in proper proportion to the brake pipe reduction the brake cylinder pressure and the brake pipe pressure will overcome the emergency reservoir pressure in chamber 50 and the pilot valve will be moved to lap position. When this takes place there will be an equalization of pressures on opposite sides of the service piston 9 and the graduating spring 16 will then move the service piston and the graduating valve back to service lap position.

When the main slide valve is moved to service position the release and emergency piston will be moved by the pressure in the emergency slide valve chamber 23 until the stop collar 35 engages the tubular guide 30 of the emergency valve. This will be a mere idle movement of said piston as the difference in pressures in chambers 23 and 4 will not be sufficient to move the emergency valve. The loose connection between the emergency piston release stem 24 and the valve stem 10 of the main slide valve permits a limited independent movement of the main slide valve, the service piston and the emergency piston. When the graduating valve has been moved to lap position the collar 17 is in engagement with its abutment 19 and the abutment 11 is in engagement with the main slide valve.

The movement of the graduating valve to lap position closes the port 144 thereby cutting off further flow of brake pipe and brake pipe reservoir air to the brake cylinder. In service lap position of the graduating valve, port 109 in the main slide valve is open to chamber 4 and is in register with the emergency reservoir charging port 115ª. (See Figs. 17ª and 18). The result of this is that should the emergency reservoir pressure be below the brake pipe pressure in chamber 4, air will flow to said reservoir and equalize the pressure therein with the pressure in chamber 4. This connection is indicated in Fig. 30 by ports 150 and 151. The check valve 117 will permit back flow of air to chamber 4.

If the pressure in the control chamber 52 is reduced through a leaky brake cylinder, the balance between the pressures in chambers 53, 52 and 50 is destroyed and the emergency reservoir pressure in chamber 50 will again prevail, with the result that the diaphragms are raised to again place the pilot valve in service position. This will result in the automatic return of the main slide valve and graduating valve to service position, and brake pipe and brake pipe reservoir air will again flow to the brake cylinder until the desired brake cylinder pressure is again built up and the balance between the pressure in the three chambers of the diaphragm structure is again established.

*Graduated release.*

The brake cylinder is connected to the main valve body at 126 in the flange E' and through a passage 127 to a large brake cylinder port 127ª in the main valve seat, and said port is connected by a cavity 128 in the main slide valve with port 79ª, thereby permitting brake cylinder pressure to pass to the release valve 77. The brake cylinder passage 127 is connected by a passage 129 to the controlling chamber 52 of the diaphragm structure so that brake cylinder pressure will be registered in said chamber. A passage 130 connects the controlling chamber to a port in the pilot valve seat and the pilot valve is formed with a cavity 131 which, in the release position of said valve, connects passage 130 to the passage 132, which leads to a port 132ª in the main slide valve seat. A cavity 133 in the main slide valve connects port 132ª with an exhaust port 134 so that in the release position of the pilot valve the controlling chamber will be connected to the exhaust port 134. The chamber 51 is at all times open to atmosphere through port 135. The brake cylinder passage 127 is connected by passage 136 to an emergency port 136ª in the emergency valve seat. This port is closed by the emergency valve in all operations except in emergency applications.

When operating in graduated release the control bar 85 is positioned to permit the plungers 82 and 83 to drop into the recesses 86 formed in said bar. This permits the release-governing valves 77 and 78 to close. With the release-governing valves in this position an increase in brake pipe pressure for a release of the brakes will result in an increase of pressure in chambers 4 and 53. The release and emergency piston 22 will be forced to release position and the diaphragm structure will be moved downwardly, carrying the pivot valve to release position. To insure a positive movement of piston 22 and the main slide valve to full-release position the main slide valve seat is provided with a port 145 and said port is connected with a port 146 in the emergency valve chamber, this latter port being always open. The main slide valve is provided with a port 147 which registers with port 145 when the main slide valve is moved a short distance from service position toward full-release position. The graduating valve is provided with a cavity 148 which, in service lap position and also in full-release and brake pipe reservoir charging position, connects port 147 with port 149 in the main slide valve. Port 149 is connected to cavity 133. As port 147 passes over port 145 a small quantity of air will be vented from chamber 23 to atmosphere through port 134, thus increasing the driving head upon piston 22 and bringing about a positive and complete movement to full-release position.

The pilot valve in release position permits the brake cylinder pressure to exhaust through the control chamber 52, passage 130, cavity 131 in the pilot valve, passage 132, cavity 133 in the main slide valve and exhaust port 134. Passages 132 and 134 are always in communication through cavity 133 except in the emergency position of the main slide valve. Brake cylinder pressure will be exhausted only through the pilot valve when operating in graduate release and the movement of the main slide valve to release position is practically an idle movement insofar as the release of brake cylinder pressure is concerned. This movement of the main slide valve and graduating valve, however, is necessary for the recharging of the brake pipe reservoir and emergency reservoir.

It is manifest that brake cylinder pressure will be released in direct proportion to the increase in brake pipe pressure and that it may be wholly or partially released depending upon the complete or partial restoration to normal brake pipe pressure. A certain definite increase in brake pipe pressure will result in a proportional decrease in brake cylinder pressure so that the brake cylinder pressure may be graduated off as desired. It is also clear that the brake cylinder pressure may be increased at any time by a definite decrease in brake pipe pressure, so that when operating in graduated release the brake cylinder pressure may be graduated off or on as desired by the engine man.

*Quick release.*

When operating in quick release the manually operable bar 85 is shifted to cause the cams 87 to force open the release-control valves 77 and 78. With the release-governing valves in position for a quick serial release of the brakes an increase in brake pipe pressure will move the main and graduating valves and the pilot valve to release position precisely as described in connection with the graduated-release operation.

When the main slide and graduating valves are in brake pipe reservoir charging position and the release-controlling valves 77 and 78 are open, brake cylinder pressure will be exhausted through port 127ª, the cavity 128 in the main slide valve, port 79ª, passage 79 around valve 77 and out through exhaust port 88. The brake cylinder pressure in chamber 52 will be exhausted through the pilot valve cavity 131, passage 132, port 132ª, the connected cavity 133 in the main slide valve, and exhaust port 134. The quick-release piston chamber 68 will be exhausted through passage 69, port 69ª in the main slide valve seat, port 139 in the main slide valve, cavity 140 in the graduating valve, port 141 in the main slide valve, port 80ª in the main slide valve seat, and thence through passage 80 and around the release valve 78 to the exhaust port 88. The pressure in chamber 70 will thereupon move the quick-release piston and open the quick-release valve P. Emergency reservoir air will thereupon flow from passage 75 into chamber 70, thence through passage 71 into the main brake pipe chamber 4 and thence directly to the brake pipe through port 3. This will result in a quick serial release of all the brakes in the train.

*Emergency position.* (*Figs. 19, 20, 21, 22, 27, 27ª, 28, 28ª and 31.*)

A sudden and rapid reduction in brake pipe pressure reduces the pressure in chamber 4 at a more rapid rate than brake pipe reservoir pressure in chamber 23 can return to brake pipe past check valve 120 and port 112. The pressure in chamber 23 will, therefore, prevail and will force piston 22 inwardly, that is to say toward the left hand as shown in Fig. 31, and move the main slide valve and the emergency valve to emergency position. After passing service position the operating stem 27 of piston 22 will move the emergency lever 37 and will open the emergency reservoir valve Q. This will permit emergency reservoir air to flow through passages 123 and 41 into the chamber 23. This flow of emergency reservoir air will force the emergency piston to full-emergency position. Emergency reservoir air will flow from chamber 23 through port 136ª to the brake cylinder. In the emergency position of the main slide valve ports 98ª and 99ª are connected by the groove 99ᵈ and the emergency brake pipe vent valve will be open to vent the brake pipe directly to atmosphere, as hereinbefore described. Brake pipe reservoir port 118ª will be in communication with a port 152 in the main slide valve (see Fig. 20), said port leading through the side of the slide valve into chamber 4 so that brake pipe reservoir air may flow into said chamber. This flow of air is indicated in the diagrammatic views, Figs. 29 to 31 inclusive, by the branch port 118ª, said branch port being shown as uncovered in Fig. 31. The brake cylinder port 127ª is uncovered so that brake pipe reservoir air may flow from chamber 4 through said port 127ª to the brake cylinder. For the purpose of diagrammatic illustration the brake cylinder port 127ª is divided in Figs. 29 to 31 inclusive. The main slide valve in emergency position connects chamber 8 to the brake pipe through passage 104, port 104ª, groove 105 and brake pipe port 3, so that said chamber will be vented to atmosphere when the brake pipe and brake pipe port 3 are cut off from chamber 4. Port 3 is extended to open chamber 8 to the brake pipe slightly ahead of full emergency position. When the brake pipe reservoir, emergency reservoir and brake cylinder pressures have equalized, the pressures in chambers 4 and 23 will be equal and piston 22 will become inoperative. As soon as this takes place the emergency spring 32 will move the emergency valve to emergency lap position. The movement of the emergency valve to lap position closes the atmospheric port 99ᶜ and the vent valve O will seat, thereby closing the brake pipe vent port 93.

An increase in brake pipe pressure for a release after an emergency application will result in first building up pressure in chamber 8 until it equalizes with the pressure in chamber 4. The spring 16 will then move the service piston 9 and the main and graduating valves and will uncover the brake pipe port 3, thereby admitting brake pipe pressure directly into chamber 4. The increasing brake pipe pressure in chamber 4 will move the piston 22 and the main and graduating valves to full-release and brake pipe reservoir charging position, as hereinbefore described.

What I claim is:

1. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means operatively connecting said valves to the service piston, an emergency valve in the emergency valve chamber, means affording a lost motion connection between the emergency piston and the emergency valve, means affording a lost motion connection between the emergency piston and the service piston, the main and graduating valves being formed with ports and passages to control the admission and release of brake cylinder pressure, and the emergency valve in emergency position operating to vent the brake pipe to atmosphere in emergency applications of the brakes.

2. A triple valve for air brake apparatus formed with a main brake pipe chamber provided with a brake pipe connection and having aligned cylindrical extensions of different diameters at its opposite ends, a service piston in the small extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means operatively connecting said valves to the service piston, an emergency valve in the emergency valve chamber, means affording a lost motion connection between the emergency piston and the emergency valve, means affording a lost motion connection between the emergency piston and the service piston, the main and graduating valves being formed with ports and passages to control the admission and release of brake cylinder pressure, and the emergency valve in emergency position operating to place an emergency reservoir in communication with the brake cylinder.

3. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means operatively connecting said valves to the service piston, an emergency valve in the emergency valve chamber, means affording a lost motion connection between the emergency piston and the emergency valve, means affording a lost motion connection between the emergency piston and the service piston, the main and graduating valves being formed with ports and passages to control the admission and release of brake cylinder pressure, the emergency valve in emergency position operating to place an emergency reservoir in communication with the brake cylinder, means operating upon a reduction of brake pipe pressure to vent the supplemental brake chamber and thereby permit the reduced brake pipe pressure in the main brake pipe chamber to move the service piston and the main and graduating valves to service application position, and means whereby said valves in service application position will connect the main brake pipe chamber to the brake cylinder.

4. A triple valve in accordance with claim 3 wherein the main slide valve and graduating valve are provided with ports and passages which in the service position of said valves connect a brake pipe reservoir with the main brake pipe chamber and the main brake pipe chamber with the brake cylinder.

5. A triple valve in accordance with claim 4 wherein a pilot valve operates upon a reduction of brake pipe pressure for an application of the brakes to vent the supplemental brake pipe chamber.

6. A triple valve in accordance with claim 5 wherein the pilot valve operates upon a reduction of brake pipe pressure to vent the supplemental brake pipe chamber to the brake cylinder, the main slide valve in service application position connecting the main brake pipe chamber to the supplemental brake pipe chamber.

7. A triple valve in accordance with claim 6 combined with means operated by brake cylinder pressure to move the pilot valve to lap position and thereby stop the venting of the supplemental brake pipe chamber, whereby the pressures in the main brake pipe chamber and the supplemental brake pipe chamber will equalize, and a graduating spring to move the graduating valve to lap position when the pressures in said two chambers have equalized.

8. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means operatively connecting said valves to the service piston, an emergency valve in the emergency valve chamber, means affording a lost motion connection between the emergency piston and the emergency valve, means affording a lost motion connection between the emergency piston and the service piston, the main and graduating valves being formed with ports and passages to control the admission and release of brake cylinder pressure and the main slide valve in emergency position operating to vent the brake pipe to atmosphere in emergency applications of the brakes.

9. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means operatively connecting said valves to the service piston, an emergency valve in the emergency valve chamber, means affording a lost motion connection between the emergency piston and the emergency valve, means affording a lost motion connection between the emergency piston and the service piston, the main and graduating valves being formed with ports and passages to control the admission and release of brake cylinder pressure, a normally closed brake pipe vent valve, and means whereby the main slide valve in emergency application position will cause said vent valve to open.

10. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means operatively connecting said valves to the service piston, an emergency valve in the emergency valve chamber, means affording a lost motion connection between the emergency piston and the emergency valve, means affording a lost motion connection between the emergency piston and the service piston, the main and graduating valves being formed with ports and passages to control the admission and release of brake cylinder pressure, an emergency reservoir valve, and means whereby the emergency piston in emergency position will open said emergency reservoir valve and thereby permit the emergency reservoir air to flow to the brake cylinder.

11. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means operatively connecting said valves to the service piston, an emergency valve in the emergency valve chamber, means affording a lost motion connection between the emergency piston and the emergency valve, means affording a lost motion connection between the emergency piston and the service piston, the main and graduating valves being formed with ports and passages to control the admission and release of brake cylinder pressure, a normally closed brake pipe vent valve, and means whereby the main slide valve and the emergency valve in emergency application positions will cause said vent valve to open.

12. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means operatively connecting said valves to the service piston, an emergency valve in the emergency valve chamber, means affording a lost motion connection between the emergency piston and the emergency valve, means affording a lost motion connection between the emergency piston and the service piston, the main and graduating valves being formed with ports and passages to control the admission and release of brake cylinder pressure, the emergency valve in emergency position placing the brake cylinder in connection with the emergency valve chamber, an emergency reservoir valve controlling connection between the emergency reservoir and the emergency valve chamber, and means whereby the emergency piston in emergency application position will open the emergency reservoir valve to permit emergency reservoir air to flow into the emergency valve chamber and thence to the brake cylinder.

13. A triple valve for air brake apparatus formed with a main brake pipe chamber provided with a brake pipe connection and having aligned cylindrical extensions of different diameters at its opposite ends, a service piston in the smaller extension of said chamber, a larger emergency piston in the larger extension of said chamber, a supplemental brake pipe chamber on the opposite side of the service piston from the main brake pipe chamber, an emergency valve chamber on the opposite side of the emergency piston from the main brake pipe chamber said chamber having a connection with a brake pipe reservoir, a main slide valve in the main brake pipe chamber, a graduating valve in said chamber, a lost motion connection between the main valve and the service piston, a direct connection between the graduating valve and the service piston, said main and graduating valves having a brake pipe reservoir charging position, an emergency reservoir charging position and an application position, means connecting the service piston with the emergency piston whereby increasing brake pipe pressure in the main brake pipe chamber will hold the graduating valve and the main slide valve in brake pipe reservoir charging position and close the emergency reservoir charging ports until there is an equalization of pressures in the main brake pipe chamber and in the emergency valve chamber, and a graduating spring arranged to be compressed when the main and graduating valves are moved into position to close the emergency reservoir charging ports, said spring moving the graduating valve to open said emergency reservoir charging ports when the pressure in the main brake pipe chamber and in the emergency valve chamber have equalized.

14. A triple valve for air brake apparatus formed with a main brake pipe chamber provided with a brake pipe connection and having aligned cylindrical extensions of different diameters at its opposite ends, a service piston in the smaller extension of said chamber, a larger emergency piston in the larger extension of said chamber, a supplemental brake pipe chamber on the opposite side of the service piston from the main brake pipe chamber, an emergency valve chamber on the opposite side of the emergency piston from the main brake pipe chamber said chamber having a connection with a brake pipe reservoir, a main slide valve in the main brake pipe chamber, a graduating valve in said chamber, a lost motion connection between the main valve and the service piston, a direct connection between the graduating valve and the service piston, said main and graduating valves having a brake pipe reservoir charging position in which the main brake pipe chamber is connected to the brake pipe reservoir, an emergency reservoir charging position in which the main brake pipe chamber is connected to the emergency reservoir and to the brake pipe reservoir and an application position in which the main brake pipe chamber is connected to the brake cylinder, the brake pipe reservoir and to the brake pipe, means connecting the service piston with the emergency piston whereby increasing brake pipe pressure in the main brake pipe chamber will hold the graduating valve and the main slide valve in brake pipe reservoir charging position and close the emergency reservoir charging ports until there is an equalization of pressures in the main brake pipe chamber and in the emergency valve chamber, and a graduating spring arranged to be compressed when the main and graduating valves are moved into position to close the emergency reservoir charging ports, said spring moving the graduating valve to open said emergency reservoir charging ports when the pressure in the main brake pipe chamber and in the emergency valve chamber have equalized.

15. A triple valve for air brake apparatus formed with a main brake pipe chamber provided with a brake pipe connection and having aligned cylindrical extensions of different diameters at its opposite ends, a service piston in the smaller extension of said chamber, a larger emergency piston in the larger extension of said chamber, a supplemental brake pipe chamber on the opposite side of the service piston from the main brake pipe chamber, an emergency valve chamber on the opposite side of the emergency piston from the main brake pipe chamber said chamber having a connection with a brake pipe reservoir, a main slide valve in the main brake pipe chamber, a graduating valve in said chamber, a lost motion connection between the main valve and the service piston, a direct connection between the graduating valve and the service piston, said main and graduating valves having a brake pipe reservoir charging position in which the main brake pipe chamber is connected to the brake pipe reservoir, an emergency reservoir charging position in which the main brake pipe chamber is connected to the emergency reservoir and to the brake pipe reservoir and an application position in which the main brake pipe chamber is connected to the brake cylinder, the brake pipe reservoir and to the brake pipe, means connecting the service piston with the emergency piston whereby increasing brake pipe pressure in the main brake pipe chamber will hold the graduating valve and the main slide valve in brake pipe reservoir charging position and close the emergency reservoir charging ports until there is an equalization of pressures in the main brake pipe chamber and in the emergency valve chamber, a graduating spring arranged to be compressed when the main and graduating valves are moved into position to close the emergency reservoir charging ports, said spring moving the graduating valve to open said emergency reservoir charging ports when the pressure in the main brake pipe chamber and in the emergency valve chamber have equalized, and means whereby the main and graduating valves when moving to release position will temporarily vent the emergency valve chamber to atmosphere.

16. A triple valve for air brake apparatus formed with a main brake pipe chamber provided with a brake pipe connection and having aligned cylindrical extensions of different diameters at its opposite ends, a service piston in the smaller extension of said chamber, a larger emergency piston in the larger extension of said chamber, a supplemental brake pipe chamber on the opposite side of the service piston from the main brake pipe chamber, an emergency valve chamber on the opposite side of the emergency piston from the main brake pipe chamber said chamber having a connection with a brake pipe reservoir, a main slide valve in the main brake pipe chamber, a graduating valve in said chamber, a lost motion connection between the main valve and the service piston, a direct connection between the graduating valve and the service piston, said main and graduating valves having a brake pipe reservoir charging position in which the main brake pipe chamber is connected to the brake pipe reservoir, an emergency reservoir charging position in which the main brake pipe chamber is connected to the emergency reservoir and to the brake pipe reservoir and an application position in which the main brake pipe chamber is connected to the brake cylinder, the brake pipe reservoir and to the brake pipe, means connecting the service piston with the emergency piston whereby increasing brake pipe pressure in the main brake pipe chamber will hold the graduating valve and the main slide valve in brake pipe reservoir charging position and close the emergency reservoir charging ports until there is an equalization of pressures in the main brake pipe chamber and in the emergency valve chamber, a graduating spring arranged to be compressed when the main and graduating valves are moved into position to close the emergency reservoir charging ports, said spring moving the graduating valve to open said emergency reservoir charging ports when the pressure in the main brake pipe chamber and in the emergency valve chamber have equalized, and means whereby the main and graduating valves in service lap position will connect the main brake pipe chamber through a restricted port to the emergency reservoir charging port.

17. A triple valve in accordance with claim 2 combined with a quick release piston, a quick release valve controlling communication between an emergency reservoir and the main valve chamber, means whereby the main slide valve in full release position will vent the quick release piston chamber to atmosphere and thereby permit said piston to open the quick release valve, and manually operable valves controlling communication between the quick release piston chamber, the brake cylinder and atmosphere.

18. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means operatively connecting said valves to the service piston, an emergency valve in the emergency valve chamber, means affording a lost motion connection between the emergency piston and the emergency valve, means affording a lost motion connection between the emergency piston and the service piston, the main and graduating valves being formed with ports and passages to control the admission and release of brake cylinder pressure, the emergency valve in emergency position operating to place an emergency reservoir in communication with the brake cylinder, a quick release piston, a quick release valve controlling communication between an emergency reservoir and the main valve chamber, means whereby the main slide valve in full release position will vent the quick release piston chamber to atmosphere and thereby permit said piston to open the quick release valve, and a manually operable valve controlling communication between the quick release piston chamber and atmosphere.

19. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means operatively connecting said valves to the service piston, an emergency valve in the emergency valve chamber, means affording a lost motion connection between the emergency piston and the emergency valve, means affording a lost motion connection between the emergency piston and the service piston, the main and graduating valves being formed with ports and passages to control the admission and release of brake cylinder pressure, the emergency valve in emergency position operating to place an emergency reservoir in communication with the brake cylinder, a quick release piston, a quick release valve controlling communication between an emergency reservoir and the main valve chamber, means whereby the main slide valve in full release position will connect the brake cylinder to an exhaust port, and a manually operable valve controlling communication between said exhaust port and atmosphere.

20. A triple valve comprising main and graduating valves, a piston operatively connected to said main and graduating valves and operating upon an increase in brake pipe pressure to move said valves to release position, a quick release valve controlling communication between an emergency reservoir and a brake pipe port, means whereby the quick release valve will be opened when the main and graduating valves are in full release position, and a manually operable valve which when closed prevents the main and graduating valves operating the quick release valve and which when opened permits the main and graduating valves to operate the quick release valve.

21. A triple valve comprising main and graduating valves, a piston operatively connected to said main and graduating valves and operating upon an increase in brake pipe pressure to move said valves to release position, a quick release valve controlling communication between an emergency reservoir and a brake pipe port, means whereby the quick release valve will be opened when the main and graduating valves are in full release position, a manually operable valve which when closed prevents the main and graduating valve operating the quick release valve and which when opened permits the main and graduating valves to operate the quick release valve, a pilot valve operating upon an increase in brake pipe pressure to connect a brake cylinder port to atmosphere, means whereby the main slide valve in full release position will connect a brake cylinder port to an exhaust port independent of the pilot valve exhaust port, and a manually operable valve controlling the brake cylinder exhaust through said independent exhaust port.

22. A triple valve comprising main and graduating valves, a piston operatively connected to said man and graduating valves and operating upon an increase in brake pipe pressure to move said valves to release position, a quick release valve controlling communication between an emergency reservoir and a brake pipe port, a quick release piston operatively connected to said quick release valve, means whereby the main and graduating valves in full release position will vent the quick release piston chamber and thereby permit said piston to open the quick release valve, a manually operable valve which when closed prevents the main and graduating valves operating the quick release valve and which when opened permits the main and graduating valve to operate the quick release valve, a pilot valve operating upon an increase in brake pipe pressure to connect a brake cylinder port to atmosphere, means whereby the main slide valve in full release position will connect a brake cylinder port to an exhaust port independent of the pilot valve exhaust port, and a manually operable valve controlling the brake cylinder exhaust through said independent exhaust port.

In testimony whereof I hereunto affix my signature.

SPENCER G. NEAL.